United States Patent [19]

Liu et al.

[11] Patent Number: 5,106,885

[45] Date of Patent: Apr. 21, 1992

[54] RADIATION CURABLE COMPOSITIONS CONTAINING MULTIFUNCTIONAL VINYL ETHER MONOMERS AND PROTECTIVE COATINGS FORMED THEREFROM

[75] Inventors: Kou-Chang Liu, Wayne; Fulvio J. Vara, Chester; James A. Dougherty, Pequannock, all of N.J.

[73] Assignee: ISP Investments Inc., Wilmington, Del.

[21] Appl. No.: 431,251

[22] Filed: Nov. 3, 1989

[51] Int. Cl.$^5$ .................. C08F 2/50; C08F 16/32; C08F 16/38; C07C 43/16

[52] U.S. Cl. ................ 522/31; 522/170; 522/181; 526/309; 526/333; 568/606; 568/607; 568/608; 568/648; 568/662

[58] Field of Search ............... 522/170, 181, 31; 526/333, 309

[56] References Cited

U.S. PATENT DOCUMENTS

| | | | |
|---|---|---|---|
| 2,563,459 | 8/1951 | Ellingboe | 526/333 |
| 3,236,900 | 2/1966 | McConnell | 526/333 |
| 3,290,385 | 12/1966 | O'Brochta | 526/333 |
| 4,142,042 | 2/1979 | Goble | 568/675 |
| 4,388,450 | 6/1983 | Crivello | 526/284 |
| 4,442,197 | 4/1984 | Crivello | 522/170 |
| 4,594,448 | 6/1986 | Hohage | 526/309 |
| 4,639,500 | 1/1987 | Kubo | 526/309 |
| 4,705,887 | 11/1987 | Crivello | 568/616 |
| 4,766,252 | 8/1988 | Vara | 568/616 |
| 4,828,873 | 5/1989 | Vara | 568/616 |
| 4,885,319 | 12/1989 | Dougherty | 525/502 |
| 4,954,582 | 9/1990 | Liu et al. | 525/502 |

Primary Examiner—Marion E. McCamish
Assistant Examiner—Arthur H. Koeckert
Attorney, Agent, or Firm—Walter Katz; Marilyn J. Maue; Joshua J. Ward

[57] ABSTRACT

What is provided herein are radiation curable compositions containing (a) multifunctional vinyl ether monomers having the formula:

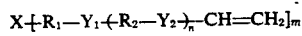

where
X is a 5-8 membered ring, saturated or unsaturated;
$R_1$ is a direct bond or $C_1$-$C_{10}$ straight or branched chain alkylene;
$Y_1$ and $Y_2$ are independently oxygen or sulfur;
$R_2$ is $C_2$-$C_{10}$ straight or branched chain alkylene;
n is 0-10; and
m is 3-5;

(b) a cationic initiator, and, optionally, (c) a polymerizable vinyl ether, epoxide, or acrylate oligomer.

10 Claims, No Drawings

RADIATION CURABLE COMPOSITIONS CONTAINING MULTIFUNCTIONAL VINYL ETHER MONOMERS AND PROTECTIVE COATINGS FORMED THEREFROM

BACKGROUND OF THE INVENTION

1. Field of the Invention

This invention relates to coatings, and more particularly, to formulations of trivinyl ether monomers useful in forming protective coatings by cationic curing.

Radiation curable coatings and films such as those formed from an acrylate oligomer are in great demand because of their rapid curing properties. However, these compounds are normally highly viscous liquids or solids and thus are unsuitable as diluents for other polymeric components of a radiation curable formulation. Indeed, such compounds themselves require the incorporation of a diluent or solvent for uniform substrate coating, control of coating thickness and curing at low temperatures. Accordingly, low viscosity monofunctional diluents are usually included in their formulations. While these diluents are reactive, they materially reduce the cross-linked density of the finished product and consequently lower abrasion resistance and ability to withstand chemical attack.

Although solvents have been used to reduce viscosity, they are detrimental in radiation curing due to their volatility which presents problems for uniform composition control unless their evaporation prior to radiant exposure is effected. Obviously, such procedure extends processing time and may pose environmental drawbacks.

To some extent, the drawbacks of high viscosity monomers can be reduced by curing at elevated temperatures. However, this alternative significantly adds to the cost of the overall operation in the expenditure of energy, temperature control and loss of more volatile components in the composition or blistering of the coating resulting from entrained volatiles.

Since acrylates are not conducive to cationically induced radiation curing, they require more costly free radical systems which are oxygen inhibited unless effected in an inert atmosphere, generally under a blanket of nitrogen. Although formulation with a photoinitiator which undergoes bimolecular reaction with a hydrogen donor minimizes the inhibitory effect of air, this benefit is realized at the expense of a greatly reduced cure rate. Also, it is found that polymerization or curing in free radical systems ceases almost immediately upon removal from the source of radiation; thus, the cured product usually contains significant amounts of unpolymerized components. Accordingly, it is an aim of research to develop a monomer having the beneficial properties of acrylates but which is amenable to radiation curing at a rapid rate by cationically induced polymerization which is not oxygen inhibited and which permits continued polymerization after removal from the source of radiation exposure.

Finally, it is noted that the unsubstituted acrylates are sensitizers and skin irritants as well as being carcinogenic, so that specialized safety precautions must be taken to protect operators from exposure. Although alkoxylation has lessened irritancy of the acrylates, their carcinogenic properties are not reduced.

Certain epoxy compounds also have been used as coatings; however these monomers and their oligomers are not readily curable by radiation. Thermal curing is generally required to increase the rate of polymerization. While vinyl ethers such as those ethers the polyethylene glycols are curable by UV light, their resulting coatings lack toughness and substrate substantivity. Also these materials have low viscosity such that it is difficult to obtain film build-up prior to curing.

Vinyl ether compounds, and methods for effectively cationically polymerizing such compounds, have been described in the literature. See, for example, U.S. Pat. Nos. 4,161,405; 4,518,788; 4,751,273; 4,775,732; and 4,749,807. However, the art is limited with respect to multifunctional vinyl ether monomers, and to formulations thereof, for forming protective coatings.

Accordingly, it is an object of this invention to provide new protective coatings from multifunctional vinyl ether monomers.

Another object of this invention is to provide substrates coated with a chemically resistant film of cationically cured trivinyl ethers.

Another object is to provide a non-toxic cross linkable copolymeric resin composition which is suitably cured as a film or as a coating on a substrate which possesses toughness, good adhesion, abrasion resistance and resistance to chemical attack in acid or basic media.

Still another object is to provide a more economical process for cross-linking monomeric or polymeric vinyl or epoxy ethers which can be effected in the presence of air at ambient temperature and pressure.

Another object is to provide a vinyl ether composition which is curable at a rapid rate by cationically induced radiation.

These and other objects will become apparent from the following description and disclosure.

DESCRIPTION OF THE INVENTION

What is provided herein is a radiation curable composition comprising:

(a) between about 1 and 99.9 wt. % of a multifunctional vinyl ether monomer having the formula:

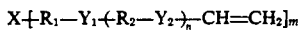

where
X is a 5–8 membered ring, saturated or unsaturated;
$R_1$ is a direct bond or $C_1$–$C_{10}$ straight or branched chain alkylene;
$Y_1$ and $Y_2$ are independently oxygen or sulfur;
$R_2$ is $C_2$–$C_{10}$ straight or branched chain alkylene;
n is 0–10; and
m is 3–5;

(b) between about 0.1 and about 5 wt. % of a cationic photoinitiator; and (c) between about 0 and 99 wt. % of a polymerizable vinyl ether, epoxide, or acrylate oligomer.

The preferred compositions of this invention are those having from about 45 to about 95 wt. % of component (a) wherein:
X is a 6-membered ring;
$R_1$ is a direct bond or a $C_1$ or $C_2$ alkylene;
$Y_1$ and $Y_2$ are both oxygen;
$R_2$ is $C_2$ alkylene;
n is 0 or 1; and
m is 3;
from about 0.5 to about 2 wt. % of component (b); and
from about 0 to about 50 wt. % of component (c).

Preferred trivinyl ether compounds (a) of the invention include the trivinyl ether of 1,3,5-tris-(2-hydroxyethoxy) benzene having the formula:

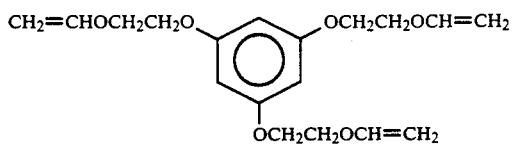

and the trivinyl ether of 1,3,5-cyclohexane-trismethanol having the formula:

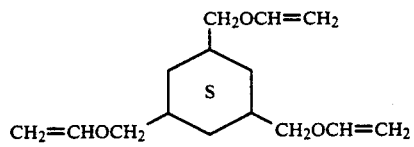

In accordance with the invention, such trivinyl ether monomers may be prepared by (a) direct vinylation of a suitable polyol with acetylene to provide monomers of the general formula above wherein $R_1$ is alkylene, or by (b) reacting a suitable polyol with an alkylene oxide, e.g. ethylene oxide or propylene oxide, with a polyol, followed by vinylation with acetylene.

In this reaction, the mole ratio of polyol to acetylene can vary between about 1:3 and about 1:6. The acetylene can be introduced into the reaction zone without dilution if present at low pressures; however, at elevated pressures, it is recommended that an inert non-oxygen containing gaseous diluent, such as nitrogen, a $C_1$-$C_3$ alkane or helium be used to dilute the acetylene reactant. When a diluent is employed, an acetylene concentration as low as 10% can be used, although between about 40 and about 60 wt. % acetylene in a diluent is most preferred.

The reaction is carried out in an oxygen free atmosphere which is generally achieved by purging with nitrogen and in the presence of a basic catalyst, such as sodium, potassium, or lithium metal, sodium or potassium hydroxide or hydride. The concentration of catalyst employed can range from about 0.01% to about 5% by weight.

In either the batch or continuous forms of the invention, the acetylene gas is bubbled through the polyol liquid itself, or a solution of the polyol in a suitable solvent, such as the dimethyl ether of tetraethylene glycol.

The process is effected at a temperature of between about 120° and about 180° C., under from about 10 to about 200 psig. total pressure, in a period of from about 2 to about 100 hours reaction time. Preferred conditions include a temperature of between about 140° to about 170° C., under between about 50 and about 100 psig. acetylene pressure and a reaction period of from about 4 to 20 hours.

Examples of the cationic photoinitiator, component (b), include the triphenyl sulfonium salt of phosphorus hexafluoride, diphenyl iodium salt, tetrazolium chloride, a phenyl onium salt and an alkyl aryl onium salt. A preferred cationic photoinitiator is triphenyl sulfonium hexafluorophosphate.

Suitable examples of the oligomer component (c), include any of the mono- and di- vinyl ethers of di-, trior tetra- ethylene or propylene glycols; $C_2$ to $C_{20}$ alkylene divinyl ethers; benzene divinyl ether; and the corresponding thioethers and epoxides. Mixtures of such compounds also may be used. Preferred oligomers are bisphenol diepoxide; triethylene glycol divinyl ether; acrylated epoxides; and vinyl ether functionalized oligomers.

The above compositions are readily prepared by mixing the components in any order until a uniform mixture is obtained. The resulting composition which is a viscous liquid is easily applied to a substrate in a thickness of from about 0.1 to about 20 mils, preferably from about 0.5 to about 10 mils. Suitable substrates include glass, ceramic, metal, plastic, wood, masonary and fabrics.

Because of the improved liquid viscosity, it is possible to retain higher thicknesses of film build-up on the substrate surface. By regulating the amounts of component (a) with respect to component (c), the desired viscosity, e.g. between about 30 and about 1,000 cps, is achieved without the introduction of extraneous chemical solvents and the like. The presence of the multifunctional vinyl ethers also permits rapid radiation curing, for example within a period of less than one second exposure to between about 100 to about 800 millijoules/cm$^2$ of UV light; between about 0.5 and about 5 megarads dosage of radiation from an electron beam or equivalent dosage from laser emissions. It is to be understood that many other sources of radiation can be used to effect curing. The radiation curing process is carried out at about room temperature under ambient pressure in the absence of solvent normally required with highly viscous materials.

The present compositions also lend themselves to thermal curing procedures effected at a temperature between about 70° C. and about 150° C. for a period of from about 5 to about 25 minutes in the presence of conventional initiators. Because of their sensitivity to curing by exposure to a source of radiation, the present products are also useful as photoresists when coated on a photographic film.

The compositions of this invention are readily spreadable viscous liquids which, when cured, provide clear films or coatings of superior toughness, abrasion resistance, and resistance to chemical attack in acid or basic media.

EXAMPLE 1

Preparation of Trivinyl Ether of
1,3,5-Tris-(2-Hydroxyethoxy) Benzene

Pyrogallol (378.3 g., 3 moles) and sodium hydroxide (0.5 g.) are charged into a one-liter autoclave. The mixture is heated to 140° C., purged three times with nitrogen and subjected to a vacuum of 20 mm Hg for one-half hour. Ethylene oxide (396 g., 9 moles) is then added at 30 psig; after all the ethylene oxide is consumed, the autoclave is purged two times with nitrogen and cooled to 30° C. Two hundred grams of the product is withdrawn and 10 g. of potassium hydroxide pellets is added to the autoclave. The autoclave is purged three times with nitrogen at 150° C. Acetylene (100 psig.) then is added and heating is continued for 16 hours to provide the trivinyl ether of 1,3,5-tris-(2-hydroxyethoxy) benzene, having the formula:

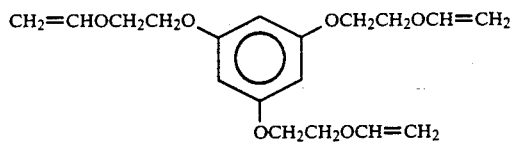

EXAMPLE 2

Preparation of Trivinyl Ether of 1,3,5-Cyclohexane-Tris-Methanol 1,3,5-cyclohexane-tris-methanol (400 g.) and potassium hydroxide pellets (8 g.) are charged into a one-liter autoclave. The autoclave is purged three times with nitrogen at 160° C. Acetylene (100 psig.) is then added and heating is continued for 12 hours to give the desired trivinyl ether having the formula below:

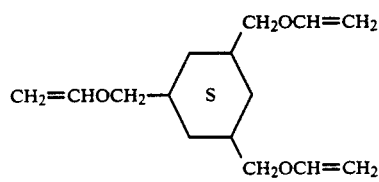

EXAMPLE 3

To a 4-ounce amber colored bottle is added 25 g. of trivinyl ether of 1,3,5-tris-(2-hydroxyethoxy) benzene prepared in Example 1 and 0.5 g. of triphenyl sulfonium hexafluorophosphate at a temperature of 60° C. with constant agitation. The formulation is coated onto a polyester plate by hand draw-down using a No. 3 Mayer bar to give a coating thickness of about 0.2 mil. The plate is subjected to a UV light exposure of 15 joules/cm$^2$ by passing it under two 200 watt/inch UV lamps at 700 feet/minute. This is followed by a thermal bake at 177° C. for 10 minutes. A protective chemical coating on the polyester is formed.

EXAMPLE 4

To a 4 ounce amber colored bottle is added 25 g. of bisphenol diepoxide having a molecular weight of 370–384 (EPON ®-828) and 12.5 g. (0.062 moles) of triethylene glycol divinyl ether (RAPI-CURE TM DVE-3) at a temperature of 45° C. with constant agitation. After a uniformly blended liquid mixture is obtained, 0.062 moles of trivinyl ether of 1,3,5-cyclohexane-tris-methanol (Ex. 2) is added and agitation is continued for an additional 15 minutes at the blend temperature. After a uniform liquid mixture is obtained 0.25 g. of a fluorinated alkyl ester surfactant (Fluorad ® 171 supplied by 3M Co.) and 2 g. of triphenyl sulfonium hexafluorophosphate are added and mixed therein at about 45° C. This formulation is coated on a aluminumn panel by hand draw-down using a No. 3 Mayer bar to give a coating thickness of 0.4 mil. The panel is subjected to a UV light exposure of 15 joules/cm$^2$ by passing them under two 200 watt/inch UV lamps at 100 feet/minute. This was followed by a thermal bake at 177° C. for 10 minutes. A highly cross-linked protective polymer film is formed which is chemical and abrasion resistant.

EXAMPLE 5

The formulation from Example 4 is repeated except that an acrylated epoxy oligomer (Ebecryl 3700, Radcure Specialties) is used in place of the bisphenol diepoxide. Two grams of 1-hydroxycyclohexylphenyl ketone was also added as a free radical photoinitiator. This formulation is coated on an oak panel using a #24 Mayer bar to give a coating thickness of 1.0 mil. The panel is subjected to UV light exposure of 15 joules/cm$^2$ by passing them under two 200 watt/inch UV lamps at 100 feet/minute. A highly cross-linked protective polymer film which is chemical and abrasion resistant is formed.

EXAMPLE 6

The formulation from Example 4 is repeated except that a vinyl ether functional urethane having the following general structure was used in place of the bisphenol diepoxide.

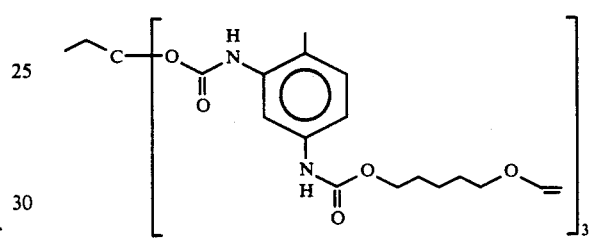

This formulation is coated on a polyester film using a #3 Mayer bar to give a coating thickness of 0.3 mil. The panel is exposed to UV light of 15 joules/cm$^2$ by passing them under two 200 watt/inch UV lamps at 100 feet/minute. A fully cured protective coating is formed.

Although the invention has been described with reference to certain embodiments, it will be understood that changes and modifications may be made which are within the skill of the art. Accordingly, it is intended to be bound only by the following claims.

What is claimed is:

1. A radiation curable composition comprising:
   (a) between about 1 and 99.9 wt. % of a vinyl ether monomer having the formula:

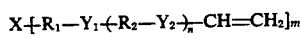

where
X is a 6 membered ring, aromatic or saturated;
R$_1$ is C$_1$–C$_{10}$ straight or branched chain alkylene;
Y$_1$ and Y$_2$ are oxygen;
R$_2$ is C$_2$–C$_{10}$ straight or branched chain alkylene;
n is 2–10; and
m is 3–5;
   (b) between about 0.1 and about 5 wt. % of a cationic photoinitiator; and
   (c) between about 0 and 99 wt. % of a polymerizable vinyl ether oligomer or an epoxide.

2. A composition according to claim 1 wherein R$_1$ is a C$_1$–C$_2$ alkylene group.

3. A composition according to claim 1 wherein R$_2$ is a C$_2$ alkylene group.

4. A composition according to claim 1 wherein m is 3.

5. A composition according to claim 1 wherein (c) is a mixture of a divinyl ether and an epoxide.

6. A composition according to claim 5 wherein (c) is a mixture of bisphenol diepoxide and triethylene glycol divinyl ether.

7. A composition according to claim 1 wherein (c) is an acrylate.

8. A composition according to claim 1 wherein (c) is an acrylate and a divinyl ether.

9. A composition according to claim 1 wherein (b) is triphenyl sulfonium hexafluorophosphate.

10. A coated substrate prepared by cationic curing of the composition of claim 1.

* * * * *